US011972764B2

(12) United States Patent
Carbune et al.

(10) Patent No.: US 11,972,764 B2
(45) Date of Patent: Apr. 30, 2024

(54) PROVIDING RELATED QUERIES TO A SECONDARY AUTOMATED ASSISTANT BASED ON PAST INTERACTIONS

(71) Applicant: GOOGLE LLC, Mountain View, CA (US)

(72) Inventors: Victor Carbune, Zurich (CH); Matthew Sharifi, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 17/533,424

(22) Filed: Nov. 23, 2021

(65) Prior Publication Data

US 2023/0144884 A1 May 11, 2023

Related U.S. Application Data

(60) Provisional application No. 63/277,717, filed on Nov. 10, 2021.

(51) Int. Cl.
*G10L 15/22* (2006.01)
*G06F 16/63* (2019.01)
*G10L 15/18* (2013.01)
*G10L 15/28* (2013.01)

(52) U.S. Cl.
CPC ............ *G10L 15/22* (2013.01); *G06F 16/63* (2019.01); *G10L 15/18* (2013.01); *G10L 15/28* (2013.01); *G10L 2015/228* (2013.01)

(58) Field of Classification Search
CPC .... G06F 16/63; G06F 16/3329; G06F 16/332; G06F 3/167; G06F 3/16; G06F 16/9035; G06F 40/35; G06F 16/90332; G06F 16/9032; G10L 15/18; G10L 15/28; G10L 2015/228; G10L 15/22; H04L 51/216; H04L 51/02
See application file for complete search history.

(56) References Cited

U.S. PATENT DOCUMENTS

| | | | |
|---|---|---|---|
| 2007/0033005 | A1 | 2/2007 | Di Cristo et al. |
| 2017/0269975 | A1* | 9/2017 | Wood ................. G10L 15/1815 |
| 2017/0300831 | A1 | 10/2017 | Gelfenbeyn et al. |
| 2018/0253209 | A1* | 9/2018 | Jaygarl ................... G06F 3/167 |
| 2019/0013019 | A1* | 1/2019 | Lawrence ........... G10L 15/1815 |
| 2019/0156198 | A1 | 5/2019 | Mars |
| 2020/0211532 | A1 | 7/2020 | Rule |
| 2021/0334306 | A1 | 10/2021 | Wang et al. |

OTHER PUBLICATIONS

European Patent Office; International Search Report and Written Opinion of Application No. PCT/US2022/048388; 14 pages; dated Feb. 6, 2023.

* cited by examiner

*Primary Examiner* — Huyen X Vo
(74) *Attorney, Agent, or Firm* — Gray Ice Higdon

(57) ABSTRACT

Systems and methods for providing audio data, from an initially invoked automated assistant to a subsequently invoked automated assistant. An initially invoked automated assistant may be invoked by a user utterance, followed by audio data that includes a query. The query is provided to a secondary automated assistant for processing. Subsequently, the user can submit a query that is related to the first query. In response, the initially invoked automated assistant provides the query to the secondary automated assistant in lieu of providing the query to other secondary automated assistants based on similarity between the first query and the subsequent query.

20 Claims, 9 Drawing Sheets

PROVIDING RELATED QUERIES TO A SECONDARY AUTOMATED ASSISTANT BASED ON PAST INTERACTIONS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances, such as an invocation indication followed by a spoken query. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

Often, a client device that includes an assistant interface includes one or more locally stored models that the client device utilizes to monitor for an occurrence of a spoken invocation phrase. Such a client device can locally process received audio data utilizing the locally stored model, and discard any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase or providing alternate invocation input), no response from the automated assistant will be provided as a result of "what time is it" not being preceded by an invocation phrase (or other invocation input).

SUMMARY

Techniques are described herein for providing dialog data from a primary automated assistant to one or more secondary automated assistants based on previous interactions of the user with the one or more secondary assistants. For example, various techniques are directed to receiving, by a primary automated assistant, a dialog between a user and the primary assistant, providing a first query that is part of the dialog to one or more secondary assistants, subsequently providing a query that is related to the first query to the same secondary assistant that was provided the first query for processing in lieu of providing the query to another secondary assistant. A user can initially invoke a primary automated assistant and utter one or more queries, to which the invoked primary automated assistant can provide to a secondary assistant. The secondary assistant can process the query and provide a response to the user, either via its own interface or via the primary automated assistant. At some point in the dialog between the user and the primary automated assistant, a query can be received that is related to the first processed query. The primary automated assistant can identify that the second received query is related to the first query and provide the second query to the same secondary automated assistant and not to another secondary assistant, thereby facilitating continuity in communication between the user and the secondary automated assistant and prevent related queries from being processed by different secondary automated assistants.

In some implementations, the user may utter an invocation phrase, such as "OK Assistant", that invokes an automated assistant (herein also referred to as the "initially invoked automated assistant") but that does not explicitly invoke other automated assistants with which the initially invoked automated assistant can at least selectively interact in processing a query received in association with (e.g., immediately following, immediately preceding) the invocation. Thus, the user may specify, based on providing an invocation input that is specific to the initially invoked automated assistant, to utilize the initially invoked automated assistant rather than invoke one of the other automated assistants individually. For example, a first invocation phrase(s) (e.g., "OK Assistant A") can, when detected, exclusively invoke a first automated assistant without invoking any other automated assistant(s). Likewise, a second invocation phrase(s) (e.g., "OK Assistant B"), when detected, can exclusively invoke a second automated assistant and without invoking the initially invoked automated assistant and/or any other automated assistant(s). The initially invoked assistant, when invoked, can at least selectively interact with other automated assistants (i.e., "secondary assistants") in processing input(s) provided in association with the invocation.

The user may utter an invocation phrase and/or otherwise perform one or more actions, such as "OK Assistant", that invokes a primary automated assistant but that does not explicitly invoke other automated assistants with which the primary automated assistant can at least selectively interact in processing a query received in association with (e.g., immediately following, immediately preceding) the invocation phrase. Thus, the user may specify, based on providing an invocation input that is specific to the primary automated assistant, to utilize the primary automated assistant rather than invoke only one of the other automated assistants individually. For example, a first invocation phrase(s) (e.g., "OK Assistant A") can, when detected, exclusively invoke a first automated assistant without invoking the primary automated assistant and/or any other automated assistant(s). Likewise, a second invocation phrase(s) (e.g., "OK Assistant B") when detected, can exclusively invoke a second automated assistant without invoking the primary automated assistant and/or any other automated assistant(s). Other invocation phrase(s) (e.g., "OK Assistant") can, when detected, invoke the primary assistant. The primary assistant, when invoked, can at least selectively interact with the first automated assistant and/or the second automated assistant (i.e., "secondary assistants") in processing input(s) provided in association with the invocation. In some implementations, the primary assistant may be a "meta assistant" or "general automated assistant" that can always interact with one or both of the first automated assistant and second automated assistant and itself lacks one or more automated assistant capabilities such as speech recognition, natural language understanding, and/or fulfilment capabilities. In other instances, the primary automated assistant can both interact with the secondary assistants while also performing its own query processing to determine responses to a query.

The primary automated assistant can provide a query to only one of the secondary assistants based on historical interactions of the user with the primary and/or secondary assistants. For example, the primary automated assistant may receive a query and provide the query to a first automated assistant. The user may be provided a response from the first automated assistant, either directly from the first automated assistant or via the primary automated assistant. Subsequently, the primary automated assistant may receive a query that is related to the first query. The primary automated assistant can determine that the new query is related to the first query and provide the second query to only the first automated assistant and not to the second automated assistant. Thus, in instances where intervening queries are processed by the first automated assistant, the user is provided with consistent responses for related queries instead of related queries being processed by different secondary automated assistants.

Thus, utilization of techniques described herein mitigates the need of a user to explicitly invoke each of multiple automated assistants based on the information that the user has interest in being provided by a particular automated assistant. For example, implementations described herein mitigate the need for a user to explicitly invoke a first automated assistant to process particular types of queries and invoke a second automated assistant to process other types of queries. Further, by identifying portions of a dialog that have been previously fulfilled by a first automated assistant and providing that automated assistant with additional related queries for processing, consistent results may be provided without the need to invoke multiple automated assistants to process related queries. By utilizing a primary assistant to perform initial analysis of received queries, pre-processing of a query (e.g., natural language understanding, text to speech processing, automatic speech recognition) can be required only once for a given query rather than the query being processed individually by each secondary assistant. Yet further, techniques described herein mitigate the need for the user to prolong the overall duration of the interaction via a follow-up query to get a response from the automated assistant that the user has interest in processing a query. Accordingly, these implementations seek to determine which automated assistant will process related queries, even in instances wherein the related queries are not consecutive in a dialog, will provide objective improvement, while otherwise inconsistent or incomplete results may be provided and require additional processing.

A primary automated assistant can be invoked by an invocation phrase that invokes the primary automated assistant and does not invoke other automated assistants in the same environment. For example, a primary automated assistant may be invoked with the phrase "OK Assistant," with one or more secondary assistants being invoked with one or more other invocation phrases (e.g., "OK Assistant A," "Hey Assistant B"). Once invoked, the primary assistant processes the query that accompanies the invocation (e.g., query that precedes and/or follows the invocation phrase). In some implementations, the primary assistant may identify multiple queries that accompany an invocation. For example, the primary assistant may continue to receive audio data for a period of time after the invocation phrase and process any additional utterances of the user during that time period. Thus, the user may not be required to invoke the primary automated assistant for each query but instead may utter multiple queries, each of which may be followed by a response from the primary automated assistant and/or one or more other secondary assistants.

In some implementations, a received spoken utterance may be processed to determine intent, terms in the query, and/or a classification of the query. For example, the primary automated assistant may perform speech recognition, natural language processing, and/or one or more other techniques to translate the audio data into data that may be further processed to determine user intent. In some implementations, one or more secondary assistants may further process incoming spoken utterances, even in instances where the processing secondary assistant has not been invoked by the user. For example, a user may invoke a primary automated assistant by uttering the phrase "OK Assistant" followed by a query. The primary automated assistant can activate a microphone and capture the utterance, as well as one or more other secondary assistants that are in the same environment as the user and/or the primary automated assistant. In some implementations, only the primary automated assistant is invoked and can provide an indication of the query (e.g., the audio data, a textual representation of the audio, an intent of the user) to one or more of the secondary automated assistants.

In some implementations, the primary automated assistant can be executing on a client device along with one or more secondary assistants. For example, a device may be executing the primary automated assistant as well as one or more other automated assistants that are invoked using a different invocation phrase than the primary automated assistant. In some implementations, one or more secondary automated assistants may be executing on different devices from the device that is executing the primary automated assistant and the primary automated assistant can, through one or more communication channels, communicate with the secondary automated device(s). For example, a primary automated assistant may provide a textual representation of a query via Wi-fi, an ultrasonic signal that is perceivable by the secondary automated assistant via a speaker, and/or via one or more other communication channels.

In some implementations, the primary automated assistant can classify a query based on the intent of the query. A classification can indicate to the primary automated assistant what type of response fulfills the query. For example, for a query of "Set an alarm," the primary automated assistant can perform natural language understanding on the query to determine an intent for the query (i.e., the user would like an alarm set). Classifications for a query may include, for example, a request to answer a question, a request to execute an application, and/or intent to perform some other task that one or more of the automated assistants is capable of performing.

Once a query is received by the primary automated assistant, the primary automated assistant can determine which secondary automated assistant is best capable of fulfilling the required intent. For example, the primary automated assistant can process the query, determine that the intent of the query is to set an alarm, and provide the intent to one or more secondary automated assistants that are in communication with the primary automated assistant. Also, for example, the primary automated assistant may further be configured to handle some or all incoming queries. For example, the primary automated assistant may receive a query, process the query, determine that it has the capability of fulfilling the query, and perform one or more tasks in response to the query.

In some implementations, one or more of the secondary automated assistants may inform the primary automated assistant of tasks that it can perform. For example, a secondary assistant may provide the primary automated assistant with a signal that indicates that it can access a music application, set alarms, and respond to questions with an answer. Thus, the primary automated assistant may be able to ascertain which, of a set of secondary automated assistants, can perform a task before providing the secondary automated assistant with the query and/or an indication of the intent of the query.

Once the primary automated assistant receives a query and processes the query to determine an intent of the query, the primary automated assistant may access one or more databases to determine whether the user has a preference for a particular secondary automated assistant for that classification of query. For example, a user may, in previous interactions with the automated assistants, utilize Assistant A for setting alarms, but prefer Assistant B when the user has interest in receiving an answer to a question. User preference may be determined based on an explicit indication by the user (e.g., setting a preference for Assistant A to set alarms) and/or based on previous usage (e.g., the user invoking Assistant B more often than Assistant A when asking a question).

The primary automated assistant can then provide the query to a secondary automated assistant for further processing. For example, the user may utter a query, the primary automated assistant may determine an intent from the query, and then provide the intent of the query to a secondary automated assistant that is capable (and indicated to the primary automated assistant it is capable) of handling. The secondary automated assistant can then perform additional processing of the query, if required, and perform one or more tasks. Tasks may include, for example, determining an answer to a question, setting an alarm, playing music via a music application, and/or utilize information in the query to execute one or more other applications. In some implementations, the secondary automated assistant can provide a response (or other fulfillment) to the primary automated assistant for completion of the task. For example, the user may utter a query that includes a question, the query may be provided to a secondary automated assistant. The secondary automated assistant can process the query, generate a response, and provide the response to the primary automated assistant, which may provide the user with an audible response to the question.

In some instances, a user may utter a second query that is related to a previous query. For example, the user may utter the query "How tall is the president," which Assistant A may fulfill. Following the query, either immediately after the answer has been provided or as a subsequent query with other non-related intervening queries, the user may utter "How old is he," relating to the president that is mentioned in the earlier query. The primary automated assistant, and/or one or more of the secondary assistants, may determine an answer to the follow-up query by identifying the intent of the first query (e.g., interest in being provided the height of the president) and determining that the second query is an additional question regarding the president referred to in the first query. The dialog between the primary automated assistant and the user may continue with additional queries and responses, either related to each other or unrelated to each other.

In instances where the user has uttered a query that is related to a previous query, the user may have interest in the same secondary assistant fulfilling the subsequent request as the one that fulfilled the initial request. However, in some instances, the subsequent query and the previous query are part of a dialog that includes intervening queries that are not related to the previous query and subsequent query. For example, a user may invoke the primary automated assistant and utter "How tall is the president," followed by "Set an alarm for 9 am," (unrelated to the first query), and subsequently utter "How old is he," which is related to "How tall is the president." The user may have interest in both the first query and the third query being fulfilled by the same secondary automated assistant, with the intervening query either handled by a different automated assistant (depending on the intent of the query) or otherwise handled separately from the related queries.

The primary automated assistant can receive an utterance from the user that includes a query and identify a secondary assistant that can handle the query. For example, for the query "How tall is the president," the primary automated assistant can determine that a first automated assistant is configured to handle "question/answer" types of queries and provide the first secondary assistant with the query. The query can be provided to the first automated assistant via one or more network protocols (e.g., Wi-fi, Bluetooth, LAN) and/or one or more other channels. For example, the primary automated assistant may generate an ultrasonic signal that is inaudible to humans that may be captured by a microphone of a device that is executing the first automated assistant. This signal may be, for example, a processed version of the audio data that includes the query (e.g., the raw audio data processed to a higher frequency and/or a textual representation of the audio data that is transmitted via a speaker but inaudible to humans). Also, for example, the primary automated assistant and the secondary automated assistant that is receiving the query may be executing on the same device and can provide the query to the secondary assistant directly. In some implementations, the query may be provided to the secondary automated assistant as audio data, as a textual representation of the query and/or as a textual representation of some portion of the information included in the query, as an intent of the query, and/or other automated speech recognition output.

The selected secondary automated assistant can provide a response to the user, such as an audible response, and the primary automated assistant can store the interaction of the user with the secondary automated assistant. For example, the primary automated assistant may store the query and the response from the secondary automated assistant, a type of response that was provided by the secondary automated assistant (e.g., a question and an answer), and an indication of the secondary automated assistant that provided the response.

Subsequent to the initial query, the primary automated assistant can receive additional queries from the user that are unrelated to the first query. These queries may be provided to the same secondary assistant that was provided the first query and/or one or more other secondary automated assistants (or the primary automated assistant, if configured to do so). Subsequent to the intervening queries, the user may utter a query that is related to the first query (e.g., the same type, similar intent, one or more similar keywords in the queries, including a reference to a previous query) and determine, based on the stored interactions of the user with the secondary automated assistants, that the user has previously interacted with a secondary automated assistant in response to a similar query. Based on determining that the user had previously interacted with a particular secondary automated assistant, the primary automated assistant can provide the subsequent query to the same secondary automated assistant.

In some implementations, providing the related query to the secondary automated assistant may be based on the time since the user has interacted with the secondary automated assistant. For example, the primary automated assistant can store, along with an indication of a dialog between the user and a secondary automated assistant, a time for the interaction. Subsequently, when a user utters a query that is related to a previous query, the primary automated assistant can determine the amount of time that has elapsed since the last interaction of the user with the secondary automated assistant. If the primary automated assistant determines that the last interaction was within a threshold time prior to the current query, the primary automated assistant can provide the new query to the same secondary automated assistant for further processing. Conversely, if the user utters a query that is related to a previous query but determines that the time that elapsed since the historical interaction between the user and secondary automated assistant is above a threshold time, the primary automated assistant may determine that the same automated assistant should not be invoked to process the query, even if it is related to a previous query. However, regardless of whether a threshold time has elapsed, the primary automated assistant may still provide the query to the secondary automated assistant if it determines that the secondary automated assistant can handle the new query.

In some implementations, the user may determine that a particular type of query is to be handled by a different automated assistant based on a user preference for one of the secondary assistants regardless of whether previous related queries were handled by a different automated assistant. For example, in some instances, the primary assistant may identify a secondary automated assistant that the user has previously utilized for a particular type of query and/or for a particular context (e.g., location of the user, time of day, subject matter of the query). In those instances, the primary automated assistant may provide the query to the preferred secondary automated assistant even if the primary automated assistant could have provided the query to a different automated assistant based on other factors.

As an example, the primary automated assistant may identify that both secondary automated "Assistant A" and "Assistant B" are capable of fulfilling the query "Play music." In a past interaction, the user can indicate that "Assistant A" should play music using a music application that it can access. A previous query of "What is the current number 1 song" may have been provided to "Assistant B." Thus, the query can be provided to either "Assistant B," which has handled a related query or "Assistant A," which the user has indicated as the preferred automated assistant for playing music. The primary automated assistant may provide the query to "Assistant A," with the context of the previous response from "Assistant B" based on the user preference, even though a continued dialog with "Assistant B" may avoid switching between automated assistants.

In some instances, a secondary automated assistant may fail to provide a response to a query. For example, a query can be provided to a secondary automated assistant and the secondary automated assistant does not respond and/or provides an indication that a response is not available. In those instances, a different secondary automated assistant can be provided the query. For example, candidate secondary automated assistants can be ranked, and the highest ranked secondary assistant can initially be provided the query. If a response is not successful, the next highest ranked secondary assistant can be provided the query.

In some implementations, the ranking of candidate automated assistants can be based on output from a machine learning model. For example, queries that were provided to one or more secondary assistants can be embedded in an embedding space and the candidate secondary assistants can be ranked according to similarity between the embeddings of the previous queries and the current query. Other indications that can be utilized to rank automated assistants can include, for example, textual and/or environmental contexts associated with provided queries, time of day, location, applications executing on a client device when the query was provided, and/or other actions of the user and/or the computing devices that are executing the candidate secondary assistants both when a query was initially provided and the current conditions.

Once a secondary automated assistant has provided a response, an indication of the query and the response can be stored by the primary automated assistant for future processing of queries that are related to those queries. For example, a secondary assistant can be provided an "answers" query that is a request for additional information. The same secondary assistant can then be provided the next "answers" query even if a different secondary automated assistant was provided an intervening query, as previously described. The indication can be stored with contextual information and/or other information, such as time of day when the query was provided, location of the secondary automated assistant, state of one or more applications executing on a computing device of the user, and/or other signals that can be subsequently utilized to determine which secondary automated assistant to provide a subsequent query.

The above description is provided as an overview of some implementations of the present disclosure. Further description of those implementations, and other implementations, are described in more detail below.

DETAILED DESCRIPTION

Figure 1:
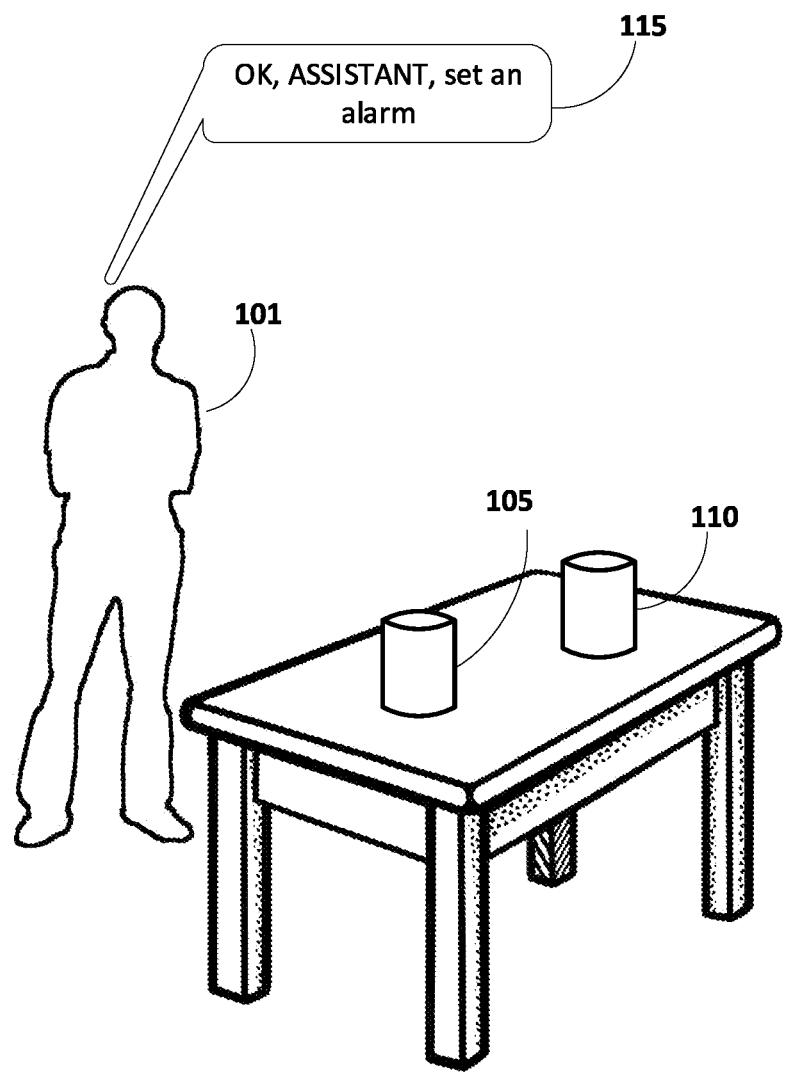
FIG. 1 is an illustration of an example environment in which implementations disclosed herein can be implemented.

Referring to FIG. 1, an example environment is provided which includes multiple automated assistants that may be invoked by a user 101. The environment includes a first standalone interactive speaker 105 with a microphone (not depicted) and a second standalone interactive speaker 110 with a microphone (also not depicted). The first speaker may be executing, at least in part, a first automated assistant that may be invoked with an invocation phrase. The second speaker 110 may be executing a second automated assistant that may be invoked with an invocation phrase, either the same invocation phrase as the first automated assistant or a different phrase to allow the user, based on the phrase uttered, to select which automated assistant to invoke. In the example environment, the user 101 is speaking a spoken utterance 115 of "OK Assistant, set an alarm" in proximity to the first speaker 105 and the second speaker 110. If one of the first and/or second automated assistants is configured to be invoked by the phrase "OK Assistant," the invoked assistant may process the query that follows the invocation phrase (i.e., "set an alarm").

Figure 2:
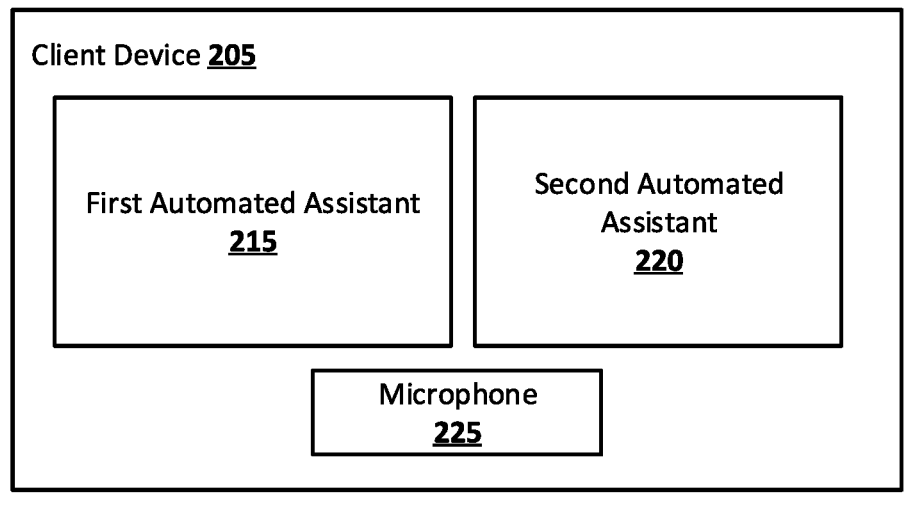
FIG. 2 is a block diagram of an example environment in which various methods disclosed herein can be implemented.
Figure 2:
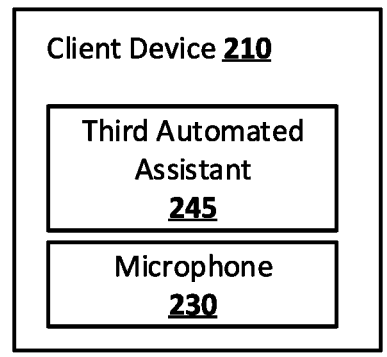

In some implementations, a device, such as first speaker 105, may be executing multiple automated assistants. Referring to FIG. 2, an example environment is illustrated that includes multiple client devices executing multiple automated assistants. The system includes a first client device 205 that is executing a first automated assistant 215 and a second automated assistant 220. Each of the first and second automated assistants may be invoked by uttering an invocation phrase (unique to each assistant or the same phrase to invoke both assistants) proximate to the client device 205 such that the audio may be captured by a microphone 225 of client device 205. For example, user 101 may invoke the first automated assistant 215 by uttering "OK Assistant 1" in proximity to the client device 205, and further invoke the second automated assistant 220 by uttering the phrase "OK Assistant 2" in proximity to client device 205. Based on which invocation phrase is uttered, the user can indicate which of the multiple assistants that are executing on the first client device 205 that the user has interest in processing a spoken query. The example environment further includes a second client device 210 that is executing a third automated assistant 245. The third automated assistant 245 may be configured to be invoked using a third invocation phrase, such as "OK Assistant 3" such that it may be captured by microphone 230. In some implementations, one or more of the automated assistants of FIG. 2 may be absent. Further, the example environment may include additional automated assistants that are not present in FIG. 2. For example, the system may include a third device executing additional automated assistants and/or client device 210 and/or client device 205 may be executing additional automated assistants and/or fewer automated assistants than illustrated.

Each of the automated assistants 215, 220, and 225 can include one or more components of the automated assistants described herein. For example, automated assistant 215 may include its own audio capture component to process incoming queries, visual capture component to process incoming visual data, hotword detection engine, and/or other components. In some implementations, automated assistants that are executing on the same device, such as automated assistants 215 and 220, can share one or more components that may be utilized by both of the automated assistants. For example, automated assistant 215 and automated assistant 220 may share an on-device speech recognizer, on-device NLU engine, and/or one or more of the other components.

Figure 3A:
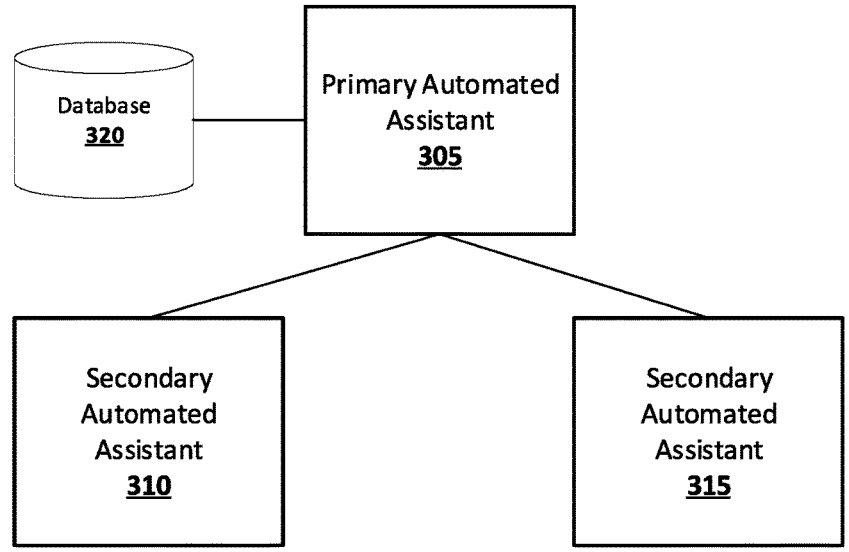
FIG. 3A and FIG. 3B are block diagrams of another example environment in which various methods disclosed herein can be implemented.

In some implementations, one or more of the automated assistants may be invoked by a general invocation phrase, such as "OK Assistant," that does not individually invoke any of the other automated assistants separately. When the user utters a general invocation phrase, one or more of the automated assistants may function as a primary automated assistant and coordinate responses between the other automated assistants. Referring to FIG. 3A, a primary automated assistant 305 is illustrated along with secondary automated assistants 310 and 315. The primary automated assistant may be invoked with the phrase "OK Assistant" or another general invocation phrase, which may indicate that the user has interest in providing a query to multiple automated assistants. Similarly, the secondary automated assistant 310 and 315 may each have one or more alternative invocation phrases that, when uttered by a user, invoke the corresponding automated assistant. For example, secondary automated assistant 310 may be invoked with the invocation phrase "OK Assistant A" and secondary automated assistant 315 may be invoked with that invocation phrase "OK Assistant B." In some implementations, one or more of primary automated assistant 305, and secondary automated assistants 310 and 315 may be executing on the same client device, as illustrated in FIG. 2 with regards to first automated assistant 215 and second automated assistant 220. In some implementations, one or more secondary automated assistants can be executing on separate devices, as illustrated in FIG. 2 with regards to third automated assistant 245.

The environment illustrated in FIG. 3A further includes a database 320. Database 320 can be utilized to store interactions of a user with one or more automated assistants. In some implementations, primary automated assistant 305 can receive a query from a user, such as a query that is uttered following an invocation phrase that invokes the primary automated assistant 305. For example, the user may utter "OK Assistant, how tall is the president?" The phrase "OK Assistant" may be an invocation phrase that is unique to primary automated assistant 305 and, once invoked, primary automated assistant 305 can determine an intent for the query following the invocation phrase (i.e., "how tall is the president"). In some implementations, primary automated assistant 305 can provide the query to one or more of the secondary automated assistants 310 and 315 for further processing. Further, primary automated assistant 305 can store an indication of the query, along with the assistant that was provided the query, in database 320 for future access by the primary automated assistant 305.

In some implementations, the primary automated assistant 305 can be a "meta assistant" that can always interact with one or both of the secondary automated assistants 310 and 315 and can itself lack one or more automated assistant capabilities such as speech recognition, natural language understanding, and/or fulfilment capabilities. In other instances, the primary automated assistant can both interact with the secondary assistants while also performing its own query processing to determine responses to a query. For example, as described further herein, primary automated assistant 305 can include a query processing engine or the primary automated assistant 305 may not be configured to process queries and provide responses to the user.

Other components of automated assistant 305, 310, and 315 are optional, and can include, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client devices executing the automated assistants may be relatively constrained in terms of computing resources (e.g., processor cycles, memory, battery, etc.), the local components may have limited functionality relative to any counterparts that are included in any cloud-based automated assistant components that are executing remotely in conjunction with the automated assistant(s).

Referring again to FIG. 2, in some implementations, one or more of the automated assistants 210, 215, and 220 may be invoked by one or more gestures that indicate that the user has interest in interacting with the primary automated assistant. For example, a user may demonstrate intention to invoke an automated assistant by interacting with a device, such as pressing a button or a touchscreen, perform a movement that is visible and may be captured by an image capture device, such as a camera, and/or may look at a device such that the image capture device can recognize the user movement and/or positioning. When a user performs a gesture or action, the automated assistant may be invoked and begin capturing audio data that follows the gesture or action, as described above.

In some implementations, one automated assistant may be selected as the primary assistant and one or more other automated assistants may be designated as the secondary assistant(s). For example, a user can utter an invocation phrase that is common to multiple automated assistants that are proximate to the user. One or more components can determine which of the plurality of devices that are executing the automated assistants is the closest to the user and that closest automated assistant may be designated as the primary automated assistant, with the other automated assistants being designated as the secondary assistants. Also, for example, when a user invokes an automated assistant, one or more components may determine which automated assistant has been utilized most frequently by the user and designate that automated assistant as the primary automated assistant.

In some implementations, the user can invoke a particular automated assistant with an invocation phrase that is unique to that automated assistant, and that automated assistant may be designated as the primary automated assistant. For example, a user may utter the invocation phrase "OK Assistant 1" to invoke first assistant 215 that is then designated as the primary automated assistant. Other automated assistants, such as second automated assistant 220 and third automated assistant 245 can then be invoked by the primary automated assistant, be provided a query by the primary automated assistant, and/or can receive responses from other automated assistants, as described herein.

In some implementations, one or more automated assistants, such as first automated assistant 215 and second automated assistant 220, may share one or more modules, such as a natural language processor and/or the results of a natural language, US, and/or SU processor. For example, referring again to FIG. 2, both first automated assistant 215 and second automated assistant 220 may share natural language processing so that, when client device 205 receives audio data, the audio data is processed once into text that may then be provided to both automated assistants 215 and 220. Also, for example, one or more components of client device 205 may process audio data into text and provide the textual representation of the audio data to third automated assistant 245, as further described herein. In some implementations, the audio data may not be processed into text and may instead be provided to one or more of the automated assistants as raw audio data.

Figure 3B:
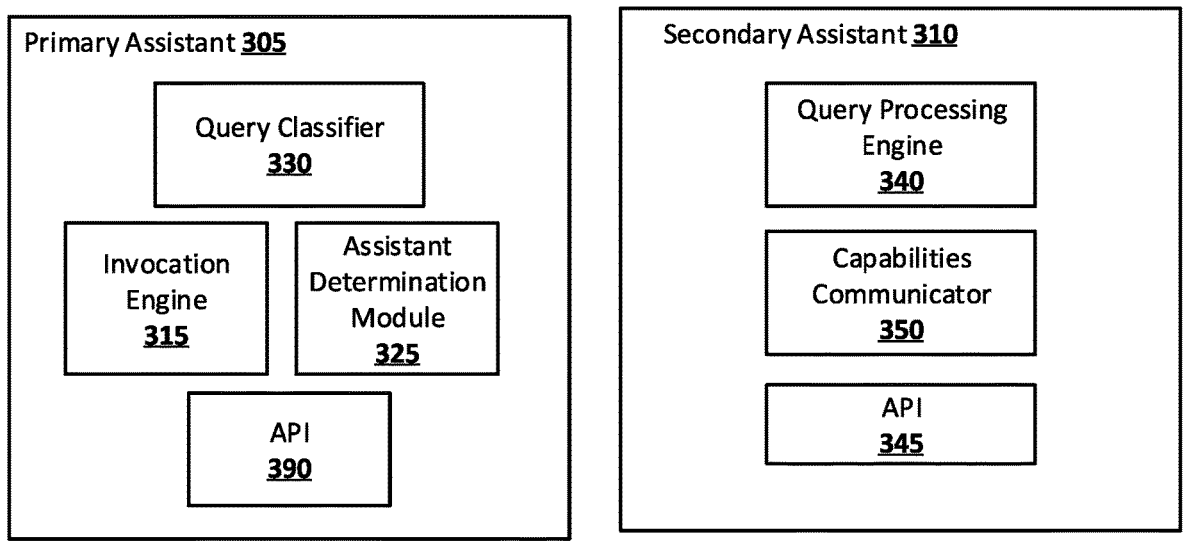

Referring to FIG. 3B, components of primary automated assistant 305 and a secondary automated assistant 310 are illustrated. As previously described, the primary automated assistant 305 and/or one or more secondary automated assistants 310 can include additional components other than the components illustrated in FIG. 3B. Additionally or alternatively, one or more components may be absent from primary automated assistant 305 and/or one or more secondary automated assistants 310. For example, primary automated assistant 305 may include a query processing engine 340 and perform as both the primary automated assistant as well as a secondary automated assistant.

Invocation engine 335 is operable to detect one or more spoken invocation phrases, and invoke the primary automated assistant 305 in response to detecting one of the spoken invocation phrases. For example, the invocation engine 335 can invoke the primary automated assistant 305 in response to detecting a spoken invocation phrase such as "Hey Assistant," "OK Assistant", and/or "Assistant". The invocation engine 335 can continuously process (e.g., if not in an "inactive" mode) a stream of audio data frames that are based on output from one or more microphones of the client device executing the primary automated assistant 305, to monitor for an occurrence of a spoken invocation phrase. While monitoring for the occurrence of the spoken invocation phrase, the invocation engine 335 discards (e.g., after temporary storage in a buffer) any audio data frames that do not include the spoken invocation phrase. However, when the invocation engine 335 detects an occurrence of a spoken invocation phrase in processed audio data frames, the invocation engine 335 can invoke the primary automated assistant 305.

Figure 4A:
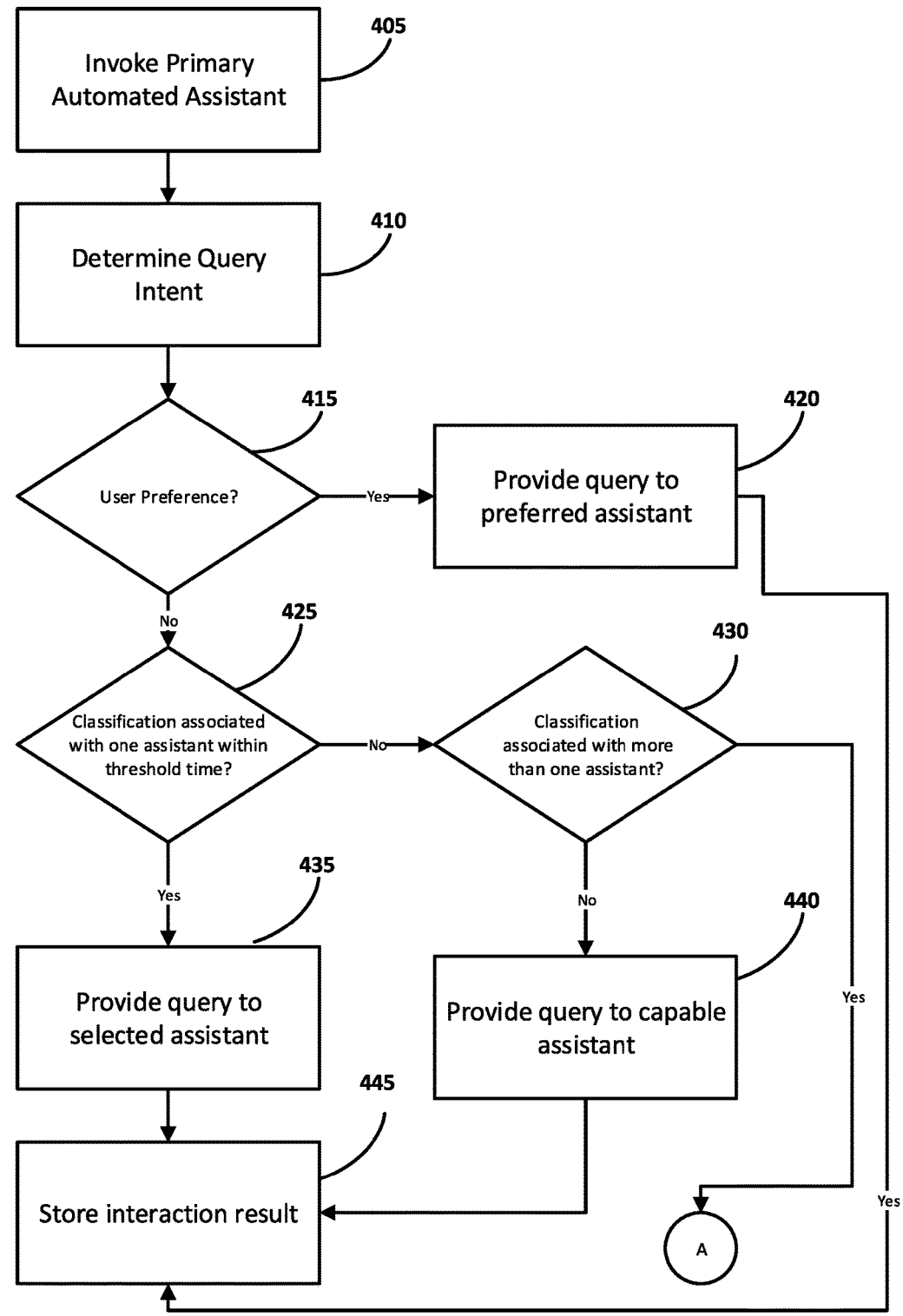
FIG. 4A and FIG. 4B depict a flowchart illustrating an example method according to various implementations disclosed herein.
Figure 4B:
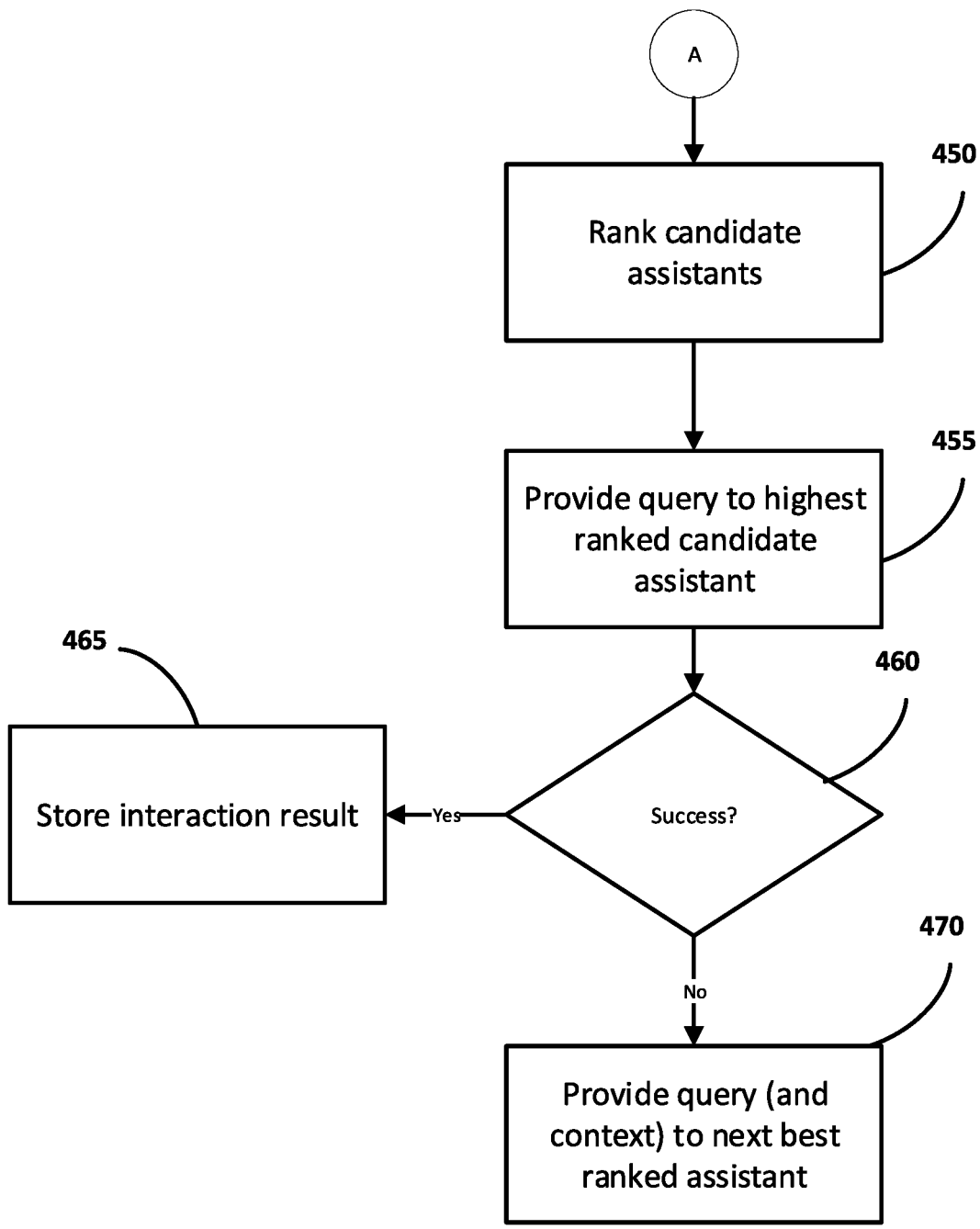

Referring to FIGS. 4A and 4B, a flowchart is illustrated that depicts a method of providing a query to a secondary automated assistant in lieu of providing the query to other automated assistants. For convenience, the operations of the method are described with reference to a system that performs the operations, such as the primary automated assistant 305 and secondary automated assistants 310 and 315 illustrated in FIGS. 3A, 3B. The system of the illustrated method includes one or more processors and/or other component(s) of a client device. Moreover, while operations of the illustrated method are shown in a particular order, this is not meant to be limiting. One or more operations may be reordered, omitted, or added.

At 405, the primary automated assistant is invoked. The primary automated assistant can share one or more characteristics with primary automated assistant 305. For example, invoking the primary automated assistant can include the user uttering an invocation phrase that is unique to the primary automated assistant (e.g., "OK Assistant"), performing a gesture that is detected by one or more cameras of the client device that is executing primary automated assistant 305, pressing a button on a client device that is executing the primary automated assistant, and/or one or more other actions by the user that indicates that the user has interest in one or more subsequent (or previous) utterances be processed by the primary automated assistant. In some implementations, the primary automated assistant is a "meta assistant" that only performs limited operations, such as determining which of a plurality of secondary automated assistants to provide a query. For example, the primary automated assistant can include one or more of the components of the primary automated assistant 305 illustrated in FIG. 3B (e.g., query classifier 330, assistant determination module 325) without including a query processing engine to process queries and provide responses. In some implementations, primary automated assistant 305 also performs the operations of a secondary automated assistant and can include a query processing engine, such as the query processing engine 340 of secondary automated assistant 310. A spoken query can be provided by the user with the invocation phrase. For example, referring to FIG. 5A, a dialog between a user 101 and a plurality of automated assistants is illustrated. To initiate the dialog, the user has uttered spoken utterance 505, which includes the invocation phrase "OK Assistant" and the query "how tall is the president."

At 410, primary automated assistant 305 determines an intent for a query that is provided, as a spoken utterance, by the user. In some implementations, query classifier 330 of primary automated assistant 305 can determine a classification for one or more queries that are provided to the primary automated assistant 305 by the user. For example, primary automated assistant 305 can receive, after invocation, a spoken utterance that includes a query, and then perform NLU on the audio data to determine an intent of the query. Subsequently, query classifier 330 can determine a classification for the query. As an example, primary automated assistant 305 may receive audio data that includes the user uttering the query "how tall is the president?" After NLU processing, query classifier 330 can determine that the query is a "answers" query (i.e., a request from the user to be provided with an answer to a query). Also, for example, primary automated assistant 305 may receive audio data that includes the user uttering the query "set an alarm." After NLU processing, query classifier 330 can determine that the query is a "productivity" query (i.e., a request from the user to perform a task). Other examples of query classifications can include requesting a device, such as a smart light and/or appliance, to perform a task, request a third party application to perform a task (e.g., send an email and/or text message), and/or other classifications of queries that may be performed by an automated assistant. Further, categories of classifications for a query can include additional information related to the query, such as subject matter for the query, additional information related to the query (e.g., a current state of a device while the query is provided), and/or other fine-grained classification that can be utilized to identify a past query that is related to a current query.

Once a query has been classified assistant determination module 325 can determine which automated assistant to provide the query to for further processing. As previously described, database 320 can include indications of past interactions of the user with the secondary automated assistants 310 and 315. Each indication can include an identifier of a classification of a query and the automated assistant that responded to the query. As an example, query classifier 330 can determine that a query of "how tall is the president" is an "answers" query and provide to secondary automated assistant 310. Further, primary automated assistant 305 can store an indication of the query and/or query classification, along with an indication that the query was provided to secondary automated assistant 310 in database 320.

In some implementations, a user may indicate a preference for a particular automated assistant to handle queries of particular classifications. Referring again to FIG. 4A, at 415, assistant determination module 325 can determine whether the user has indicated a preference for a particular secondary automated assistant to process queries of the classification that was determined at 410. If the user 101 has indicated a preference, the preferred secondary automated assistant can be provided the query at 420. For example, a user may indicate, either explicitly or based on past interactions with secondary automated assistants, that all text messaging (e.g., queries classified as "messaging") be handled by automated assistant 310. An indication of the user preference can be stored in database 320 and, for subsequent queries that are classified as "messaging," the queries can be provided to automated assistant 310 instead of to other secondary automated assistants.

If a user has not indicated a preference for a particular secondary automated assistant, at decision block 425, assistant determination module 325 determines, for a classified query, whether a secondary automated assistant has been provided a query of the same classification as the current query within a threshold period of time. In some implementations, assistant determination module 325 can identify, from database 320, which automated assistant previously handled queries of the same classification as the current query. For example, a query of "how many kids does he have" may be received by primary automated assistant 305 and classified by query classifier 330 as an "answers" query. Assistant determination module 325 can determine, based on one or more indications in database 320, that a previous "answers" query was handled by secondary automated assistant 310 and/or that the user has indicated a preference for "answers" queries to be handled by secondary automated assistant 310. In response, assistant determination module 325 can determine to provide, at 430, the query "how many kids does he have" to secondary automated assistant 310 in lieu of providing the query to another automated assistant.

In some implementations, one or more communications protocols may be utilized to facilitate communication between automated assistants. For example, referring to FIG. 3B, secondary automated assistant 310 includes an API 345 that can be utilized by primary automated assistant 305 to provide secondary automated assistant 310 with a query. In some implementations, one or more other communications protocols can be utilized. For example, in instances where primary automated assistant 305 and secondary automated assistant 310 are executing on separate client devices, primary automated assistant 305 can utilize a speaker of the client device executing the assistant to transmit a signal (e.g., an ultrasonic audio signal that includes the audio data of the spoken utterance and/or an encoding of the natural language processing of the query) that can be detected by a microphone of the client device.

In some implementations, secondary automated assistant 310 can include a capabilities communicator 350 that can provide primary automated assistant 305 with the classifications of queries that can be handled by secondary automated assistant 310. For example, secondary automated assistant 310 may be configured to handle "answers" queries (i.e., include a query processing engine 340 that can respond to queries that include a question) but may not be configured to handle "messaging" requests. Thus, capabilities communicator 350 can provide indications of the classifications of queries that can be handled and/or indicate classifications of queries that it will opt out of responding to. In some implementations, secondary automated assistant 310 may utilize API 390 of primary automated assistant 305 and/or one or more other communication protocols (e.g., ultrasonic signal) to indicate its capabilities to primary automated assistant 305.

At block 445, the interaction of the user with the secondary automated assistant that was provided the query is stored in database 320. In some implementations, a time may be stored with queries (and/or classifications of queries) and the automated assistant that handled the query. Thus, in some implementations, assistant determination module 325, in determining which secondary automated assistant to provide a query, can determine whether one of the secondary automated assistants handled a query of the same classification within a threshold period of time. As an example, a user may submit a query of an "answers" classification, which is provided to secondary automated assistant 310 for processing. An indication of the query (or its classification) may be stored by assistant determination module 325 along with a timestamp indicating the time at which the query was provided to secondary automated assistant 315. Subsequently, when another query that query classifier 330 has determined is an "answers" query is provided by the user (e.g., the next query or a query after one or more intervening queries), assistant determination module 325 can determine how long has elapsed since secondary automated assistant 315 last handled an "answers" query. If secondary automated assistant 315 handled an "answers" query within a threshold time, the subsequent "answers" query can be provided to secondary automated assistant 315.

In some implementations, query processing engine 340 may provide at least a portion of the query and/or information included in the query to a third party application in order to determine a response. For example, the user may submit a query of "Make me a dinner reservation tonight at 6:30," which is provided to a secondary automated assistant for further processing. The secondary automated assistant may be provided with the audio data and/or a textual representation of the audio data, perform natural language understanding on the query, and provide some portion of the information to a third party application, such as a dining reservation application. In response, the third party application can determine a response (e.g., check if dining reservations are available), provide a response to the secondary automated assistant, and the secondary automated assistant can generate a response based on the response from the third party application.

In some implementations, storing the interaction may include storing a context of a query, in database 320, along with the secondary automated assistant that handled the query. Additionally or alternatively, a timestamp, and/or other information related to the query may be stored in database 320 with an indication of the interaction. For example, a query of "how tall is the president" may be received by primary automated assistant 305. The query may be provided to secondary automated assistant 310 and the classification of the query, a timestamp of when the query was provided to secondary automated assistant 310, and/or the query (e.g., audio data of the user's spoken utterance, NLU data of the query, a textual representation of the query) may be stored in database 320. Further, context for the query may be stored, such as an indication that the query is related to "the president." Subsequently, the user may submit a query of "how many kids does he have," and assistant determination module 325 may determine, based on the indication stored in database 320, that the user submitted a query of the same classification (e.g., an "answers" query) within a threshold period of time. Primary automated assistant 305 may provide the query (i.e., "how many kids does he have") along with context (e.g., the previous query being related to "the president") to secondary automated assistant 310 for further processing. In some implementations, secondary automated assistant 310 may separately store an indication of the context of previous queries such that, upon receiving a query of "how many kids does he have," the secondary automated assistant 310 can determine that, based on the previous context, "he" refers to "the president."

Referring again to FIG. 4A, at decision block 425, in some implementations, assistant determination module 325 may determine that a secondary automated assistant has not processed a query of the same classification as a current query within a threshold period of time. For example, a query may be submitted that is the first query of that classification that has been received by the primary automated assistant 305 in a current session and/or within a period of time. In instances where assistant determination module 325 determines, based on the indications in database 320, that the user has not indicated a preference for an automated assistant to handle queries of the current classification and/or that a secondary automated assistant has not handled queries of the current classification, assistant determine module 325 may select a secondary automated assistant to handle the query based on the capabilities of available secondary automated assistants. For example, primary automated assistant 305 can determine, based on the capabilities of each secondary automated assistant that are provided by capabilities communicator 350, as described herein, one or more candidate secondary automated assistants to provide a query based of the current classification. For example, an "answers" query may not have been processed by either secondary automated assistant 310 or secondary automated assistant 315 within a threshold period of time. Assistant determination module 325 may determine, based on the capabilities communicator of each of the available secondary automated assistants, that secondary automated assistant 310 is configured to handle "answers" queries and secondary automated assistant 315 is not configured to handle "answers" queries. Thus, the query may be provided to secondary automated assistant 310 in lieu of providing the query to secondary automated assistant 315, which is not configured to handle such queries.

In some implementations, a secondary automated assistant can be selected based on the user that has uttered the query. For example, in instances where the primary automated assistant cannot determine that a related query has been provided to a secondary automated assistant within a threshold amount of time, the primary automated assistant can determine to provide the query to the same secondary automated assistant that was previously provided a query by the same user. As an example, a first user may provide a query of "Do I have anything on my calendar" to the primary automated assistant, which is provided to a secondary automated assistant for processing. Subsequently, other users may provide additional queries that are processed by a different secondary automated assistant. Subsequently, the first user may submit a query of "How tall is the president," but more than a threshold amount of time after submitting the first query. In that instance, to improve continuity in the conversation, the same secondary automated assistant may be provided the subsequent query based on identifying the speaker as the same speaker as the initial query.

At decision block 430, assistant determination module 325 may determine that an automated assistant has not handled a query of the current classification within a threshold period of time. In response, at block 440, assistant determination module 325 can provide the query to a secondary automated assistant that is capable of processing queries of the current classification. For example, assistant determination module 325 can select an automated assistant that, via the capabilities communicator 350 of the automated assistant, has indicated that it is capable of handling queries of the current classification. Once the query has been provided to a capable secondary automated assistant, at block 445, the interaction can be stored in database 320 for later utilization by assistant determination module 325.

Assistant determination module 325 may determine that multiple secondary automated assistants may be configured to handle a query of a particular classification but none have handled such queries within a threshold period of time (or multiple secondary automated assistants have handled a query of the current. Additionally or alternatively, multiple secondary automated assistants may have handled queries of the same classification within a threshold period of time. For example, secondary automated assistant 310 may have handled a query of "set an alarm" that is classified by query classifier 330 as a "productivity" query and further, secondary automated assistant 315 may have handled a query of "turn off the bedroom lights" that is also classified by query classifier 330 as a "productivity" query. In instances where multiple secondary automated assistants are identified by assistant determination module 325 to handle a query, candidate secondary automated assistants can be ranked and/or scored such that one secondary automated assistant may be selected in lieu of other secondary automated assistants.

Figure 5A:
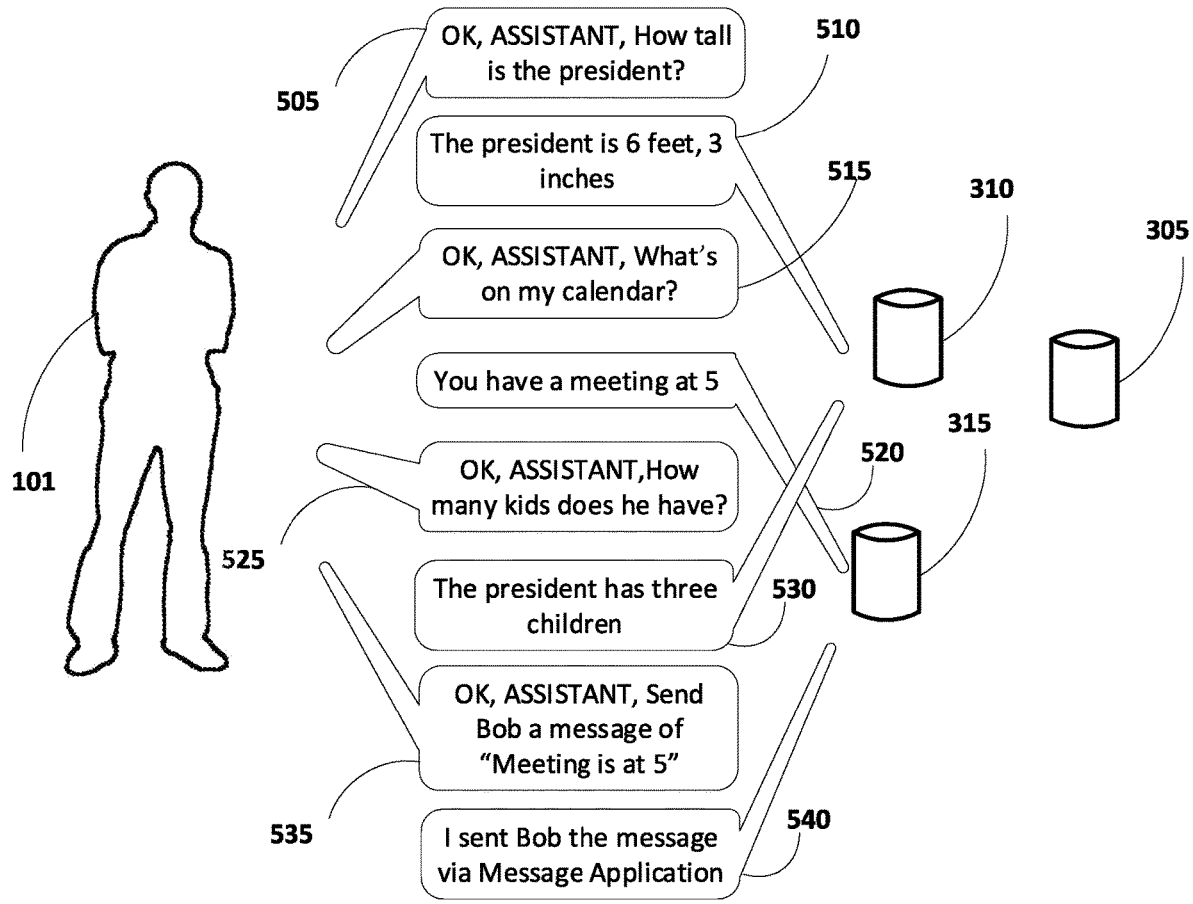
FIGS. 5A and 5B depict dialogs that include a user, a first automated assistant, and a second automated assistant according to various implementations disclosed herein.

Referring to FIG. 5A, interactions between a user 101 and two automated assistants 305 and 310 is illustrated. In the illustrated environment, the primary automated assistant 305 and secondary automated assistants 310 and 315 are each illustrated as executing on separate devices. However, in some implementations, one or more of the automated assistants can be executing on the same device, as illustrated in FIG. 2. Further, the illustrated dialog is received by primary automated assistant 305, which does not fulfill queries. Thus, the spoken utterances of the user 101 can be detected by a speaker of primary automated assistant 305, which provides the query to secondary automated assistant 310 and/or 315 for further processing. Thus, although the user 101 can interact with primary automated assistant 305, responses to queries can be provided by secondary automated assistants 310 and 315, as illustrated.

At dialog turn 505, the user 101 utters the utterance "OK Assistant, how tall is the president." The invocation phrase "OK Assistant" can invoke the primary automated assistant 305, as described herein, and further, the primary automated assistant 305 receives, via one or more microphones, the spoken query "how tall is the president." Query classifier 330 of primary automated assistant 305 can determine a classification for the query, such as a classification of "answers," indicating that the user 101 is requesting an answer to the query. Further, primary automated assistant 305 can determine, based on the indications in database 320, that the user 101 has not previously submitted a query that has been classified as "answers" within a threshold period of time within the current dialog session. In response, assistant determination module 325 can provide the query to one of the candidate secondary automated assistants, such as secondary automated assistant 310. The determination to provide to one automated assistant in lieu of providing the query to other automated assistants can be based on, for example, a user preference for secondary automated assistant 310 in providing "answers" queries identified based on past interactions of the user with the secondary automated assistants, time of day, location of the user, and/or other factors that indicate that the user has interest in secondary automated assistant 310 processing the query in lieu of secondary automated assistant 315 processing the query. Further, a capabilities communicator 350 of secondary automated assistant 310 can provide an indication to primary automated assistant 305 that it is capable of handling "answers" queries, and primary automated assistant 305 can provide the query to secondary automated assistant 310 based on the indicated capabilities of the automated assistant.

Figure 5B:
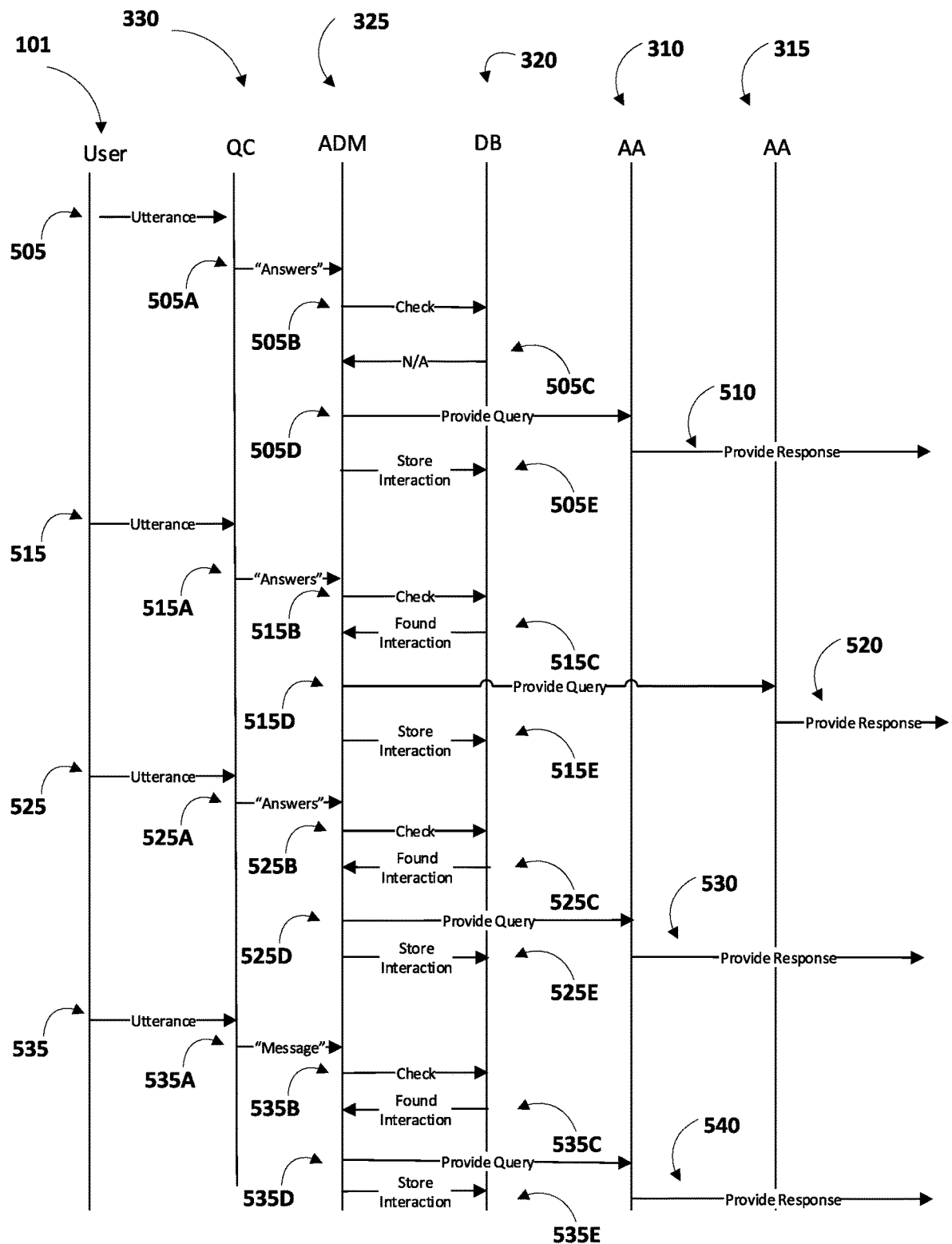

Referring to FIG. 5B, a diagram is provided that includes the dialog turns of FIG. 5A and the components that process the query. As illustrated, spoken utterance 505 is first provided to query classifier 330, which determines a classification of "answers" at 505A. The classification of "answers" and/or other information related to the query (e.g., context) are provided to assistant determination module 325, which checks 505B in database 320 to determine if a secondary automated assistant has previously processed an "answers" query. Because this is the first query that has been processed that is classified as "answers," the database 320 does not include an indication of a secondary automated assistant and provides an "n/a" response 505C. In response, assistant determination module 325 determines, based on one or more factors (e.g., previous interactions of the user with secondary automated assistants, machine learning model output) to provide the query to secondary automated assistant 310 (at 505D) in lieu of providing the query to secondary automated assistant 315.

Primary automated assistant provides the query to secondary automated assistant 310 for further processing. In response, query processing engine 340 of secondary automated assistant determines a response 510 to the query. For example, referring again to FIG. 5A, in response to a query of "how tall is the president," secondary automated assistant 310 responds with "the president is 6 feet, 3 inches." In some implementations, the response may be provided by a speaker that is specific to secondary automated assistant 310 (e.g., a speaker that is integral with the device that is executing the automated assistant). In some implementations, the response may be provided by a speaker of one or more other devices, such as primary automated assistant 305. In those instances, a voice profile can be utilized to provide the response that is specific to the secondary automated assistant 310 such that the user can be made aware, based on audio characteristics of the response, that the response was generated by secondary automated assistant 310 and not by another automated assistant even if a speaker is utilized by more than one automated assistant in providing responses. Further, referring again to FIG. 5B, once the query is provided to secondary automated assistant 310 (and/or once secondary automated assistant 310 has provided a response 510), assistant determination module 325 can store an interaction 505E in database 320 that indicates the query, the query classification, a timestamp of when the query was provided, context for the query, and/or other information related to the query such that, when subsequent "answers" queries are received, assistant determination module 325 can identify the previous interaction and utilize the interaction to determine which automated assistant to provide the subsequent "answers" query.

In some implementations, assistant determination module 325 may determine that multiple secondary automated assistants have handled queries of the current classification. In those instances, at block 450, assistant determination module 325 can rank candidate secondary automated assistants to determine which secondary automated assistant to provide a query. As previously described, in some implementations, a query with the current classification may not have been previously processed within a threshold period of time (or at all). Thus, any secondary automated assistant that is configured to handle the query can be a candidate automated assistant. In some implementations, multiple secondary automated assistants may have processed queries of the same classification as the current query and assistant determination module 325 can determine which, of multiple assistants, to provide the query. Further, in some implementations, a related query of a different classification as the current query may have been processed and, based on determining that the previous query is related, one of the secondary automated assistants may be selected for processing the query over other secondary automated assistants.

In some implementations, the current query and previous queries may be embedded in an embedding space to determine whether one or more of the previous queries is related to the current query and thus rank candidate secondary automated assistants to determine which secondary automated assistant to provide the current query. For example, in instances where multiple secondary automated assistants have previously processed queries of the same classification as the current query, the previous queries can be embedded in an embedding space and the relatedness of the current query to the previously processed queries. Thus, the secondary automated assistant that previously processed a query that is most related to the current query can be selected as the secondary automated assistant to process the current query (and/or the relatedness of past processed queries can be a factor in determining which automated assistant to provide the current query).

Referring again to FIG. 5A, spoken utterance 515 is provided by the user 101. The utterance, "OK Assistant, what's on my calendar" is received by primary automated assistant 305, classified, and provided to secondary automated assistant 310 for further processing. In response, secondary automated assistant 310 provides a response of "you have a meeting at 5." Referring again to FIG. 5B, the spoken utterance 515 is first provided to query classifier 305, which determines that the query is an "answers" query 515A. The classification is provided to assistant determination module 325, which determines, based on indications stored in database 320, whether the user 101 has previously interacted with an automated assistant that has processed an "answers" query. After checking database 320 at 515B, the previous interaction of the user 101 with secondary automated assistant 305 is identified 515C. However, assistant determination module 325 can further determine that, based on contextual information identified from the previous "answers" query 505, that this query is not related to the previous "answers" query. In response, assistant determination module 325 may not select secondary automated assistant 305 as the automated assistant to process the query based on determining a context of spoken utterance 515 is not related to the context of the previous "answers" query (i.e., the utterance 515 is not a continuation of a dialog initiated by utterance 505). Assistant determination module 325 can determine, based on, for example, the capabilities that are indicated by each of the automated assistants, to provide the query to secondary automated assistant 310 based on, for example, identifying that secondary automated assistant 310 is configured to access the calendar of the user, has previously been utilized by the user to access the calendar of the user, and/or an indicated user preference of secondary automated assistant 310 over secondary automated assistant 305 when processing calendar-related queries. Once the query has been provided to secondary automated assistant 310, the interaction is stored 515E in database 320 and secondary automated assistant 310 can provide a response. As with previous interactions that are stored in database 320, the interaction with secondary automated assistant 310 can be stored with contextual information, a timestamp, a vector embedding of the query and/or response provided by a secondary automated assistant, and/or other information related to the query and/or response for utilization in determining whether to provide subsequent queries to secondary automated assistants. In some implementations, previous interactions can be stored for a period of time such that, for subsequent queries, only interactions that occurred within a threshold time period are reviewed to determine if a query is related to previous queries.

Referring again to FIG. 5A, the user 101 provides spoken utterance 525 of "how many kids does he have." This spoken utterance is a continuation of the dialog which was initiated with utterance 505 and, in order to generate a response, at least a portion of the context of the previous dialog is required. For example, spoken utterance 525 includes the term "he," which is in reference to "the president," as indicated by the user 101 in utterance 525. In response, secondary automated assistant 310 responds with "the president has two children."

Referring again to FIG. 5B, spoken utterance 525 is provided to the query classifier 330, which classifies the query as an "answers" query at 525A. As with previous queries, assistant determination module 325 checks 525B in database 320 to identify (at 525C) that both secondary automated assistant 310 and secondary automated assistant 315 have processed "answers" queries within a threshold period of time. However, based on content of the current query (e.g., having the term "he" without an indication of what the term refers to), and based on contextual information that may be stored with the interaction 505E, assistant determination module 325 can determine to provide the query 525D to secondary automated assistant 310 in lieu of providing the query to secondary automated assistant 315 (which has processed an "answers" query that is unrelated to the current query). Further, the interaction with secondary automated assistant 310 is stored (525E) in database 320, along with query information, context, and/or other information as described herein.

Referring again to FIG. 5A, the user next provides spoken utterance 535 of "OK, Assistant, send Bob a message of 'Meeting is at 5.'" In response, secondary automated assistant 310 performs the request and responds to the user 101 with "I sent Bob the message via Message Application." In some implementations, primary automated assistant can determine that the spoken utterance 535 is unrelated to other previous queries, as previously described, and thus determine an automated assistant to provide the query to, such as based on the capabilities that are provided by each automated assistant, user preferences, and/or other factors. In some implementations, primary automated assistant 305 may determine that utterance 535 is related to a meeting (based on terms in the query) and that the user 101 previously interacted with secondary automated assistant 315 regarding a meeting in a calendar application. Thus, for continuity, primary automated assistant 305 may provide the query to secondary automated assistant 315 over secondary automated assistant 310 based on determining that the context of the query is more related to previous queries that were processed by secondary automated assistant 315 than those processed previously by secondary automated assistant 310.

Referring again to FIG. 5B, spoken utterance is first provided to query classifier 330, which determines that the query is a "messaging" query 535A (i.e., a request to send a message). In response, assistant determination module 325 checks 535B with database 320 and does not identify a previous interaction of the user 101 with a secondary automated assistant that processed a "messaging" query, but does identify (at 535C) the previous interaction of the user 101 with secondary automated assistant 315 regarding a calendar (i.e., stored interaction 515E). Thus, assistant determination module 325 can determine that the previous interaction with secondary automated assistant 315 is more related to the current query and provide the query 535D to secondary automated assistant 315 in lieu of providing the query to secondary automated assistant 310. For example, assistant determination module 325 can embed, in an embedding space, utterances 505, 515, 525, and 535, and/or responses 510, 520, and 530 to determine, utilizing one or more machine learning models, that utterance 535 is most similar to response (e.g., utterance 535 and response 520 includes a reference to "meeting"), and provide the utterance 535 to the same secondary automated assistant 315 that processed utterance 515 and provided response 520. In response, the query processing engine of secondary automated assistant 315 can determine a response, perform the requested action (i.e., sending a message to Bob), and provide response 540 to the user 101. The interaction with secondary automated assistant 535E can then be stored in database 320 for subsequent utilization in determining when to provide a "messaging" query to a secondary automated assistant.

In some implementations, a machine learning model may receive, as input, one or more other signals and provide, as output, a ranking of candidate secondary automated assistants to provide a query when a previous query of the same classification has not been provided to a secondary automated assistant within a threshold period of time. For example, a current context and historical contexts corresponding to when previous queries were provided to secondary automated assistants can be utilized as input to a machine learning model to determine which automated assistant to provide a query. Context for a query can include, for example, images and/or interfaces that are currently presented to the user via one or more computing devices, current applications that are being accessed by the user when providing a query, the time of day that a user provides a query, and/or one or more other user or device features that can indicate an intention of the user to provide a query to a secondary automated assistant in lieu of providing the query to other secondary automated assistants.

Referring again to FIG. 4B, the query can be provided, at block 455, to the candidate secondary automated assistant that is ranked highest. At decision block 460, if the selected secondary automated assistant successfully processes the query, the interaction with the secondary automated assistant is stored in database 320 (at block 465). If the selected automated assistant does not successfully process the query (e.g., is unable to generate a response, fails to perform an intended action), at block 470, the query can be provided to the next highest ranked candidate automated assistant. This can continue until all candidate automated assistants have been provided the query unsuccessfully and/or until a candidate secondary automated assistant successfully processes the query.

In some implementations, when a secondary automated assistant is first provided a query that is determined to be related to a previous query that was provided to a different secondary automated assistant, context of the previous query may be provided with the query. For example, for an initial query of "how tall is the president," a textual context that includes an indication that the query was related to "the president" can be stored in database 320. Subsequently, if a query of "how many kids does he have" is received and provided to a different secondary automated assistant than the first query, the textual context of "the president" can be provided to assist the secondary automated assistant in resolving "he" in the subsequent query. In some implementations, other contextual information can be provided with the subsequent query, such as time of day, the state of one or more computing devices, applications currently being executed by the user, and/or other contexts of either a previous query and/or the current query that can assist the selected secondary automated assistant in resolving one or more terms in the provided query.

Figure 6:
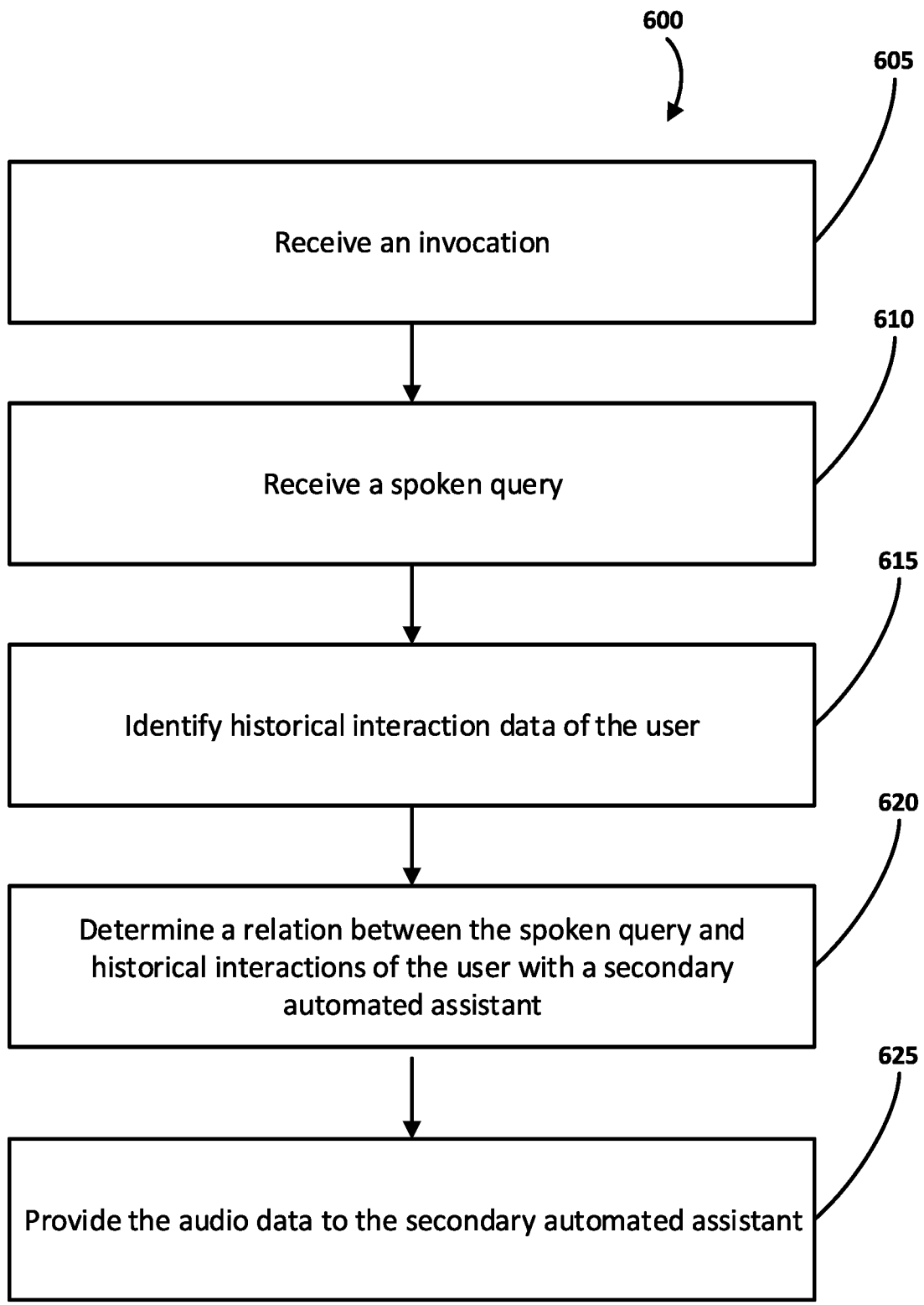
FIG. 6 is a flowchart illustrating an example method according to various implementations disclosed herein.

FIG. 6 depicts a flowchart illustrating another example method 600 of providing a query to a secondary automated assistant in lieu of providing the query to other automated assistants. For convenience, the operations of the method 600 are described with reference to a system that performs the operations. This system of method 600 includes one or more processors and/or other component(s) of a client device. Moreover, while operations of the method 600 are shown in a particular order, this is not meant to be limiting. One or more operations may be reordered, omitted, or added.

At step 605, an invocation is received by a primary assistant. In some implementations, the invocation can be a spoken utterance that transitions the primary automated assistant from an inactive state (e.g., not processing incoming spoken utterances) to an active state. In some implementations, the invocation can include a gesture of the user, the user selecting a button via a client device and/or interface of a client device, and/or one or more other actions that indicate an interest by the user in activating the primary automated assistant.

In some implementations, the primary automated assistant can share one or more characteristics with primary automated assistant 305. For example, in some implementations, the primary automated assistant can receive spoken utterances via one or more microphones and determine a secondary automated assistant to process the spoken utterance. In some implementations, the primary automated assistant can include a query processing engine that allows the primary automated assistant to generate responses to spoken queries and/or other utterances. In some implementations, the primary automated assistant can perform processing of a spoken utterance, such as ASR, US, NLU, and/or other processing to determine content of the spoken utterance.

In some implementations, an invocation can indicate a specific secondary automated assistant to which the audio data is provided. For example, the primary automated assistant can be invoked by a general invocation, such as "OK Assistant," and can further be invoked with a secondary invocation that indicates a specific automated assistant, such as "OK Assistant A." In this instance, the general automated assistant can provide audio specifically to "Assistant A," (or provide an indication of the audio data) in lieu of providing the audio data to other secondary automated assistants.

Additionally or alternatively, in instances where the invocation indicates a specific automated assistant, the invocation may be utilized, along with one or more other signals, to rank automated assistants when determining which automated assistant to provide the audio data.

At step 610, a spoken query is received by the primary assistant. In some implementations, the spoken query can include a request for an automated assistant to perform one or more actions. For example, the user may submit a spoken query of "How tall is the president" with the intention of receiving a response that includes an answer to the posed question. Also, for example, the user may submit a spoken query of "turn off the lights" with the intention that one or more smart lights transition from on to off.

At step 615, historical data of the user is identified. The historical data can include information related to one or more secondary automated assistants and queries that were processed by each of the secondary automated assistants. For example, historical data can include textual representations of queries, content for when queries were processed, the automated assistant that generated responses to queries, the generated responses, and/or other indications of historical interactions of the user with one or more automated assistants.

At step 620, a relation is determined between at least a portion of the historical interactions and the spoken query. In some implementations, the relation can be determined based on identifying previous interactions of the user with one or more of the secondary automated assistants and determining, based on the current query, which secondary assistant processed a previous query that is most similar to the current query. For example, a user may have submitted a previous query of "How tall is the president." Subsequently, the user may submit a query of "How many kids does he have," with "he" being a reference to "the president." Based on the context of the second query following the first query (either immediately or with one or more intervening queries), a relation can be determined between the queries. Further, based on the indications stored in the database regarding previous queries, the same secondary automated assistant that generated a response to the first query can be identified such that the second query can be provided to the same automated assistant.

At step 625, the audio data that includes the spoken query is provided to a secondary automated assistant. In some implementations, the audio data can be provided as a transcription of the audio data. For example, the general automated assistant can perform automatic speech recognition on the audio data and provide the transcription to the secondary automated assistant. In some implementations, the audio data can be provided as audio (e.g., the raw audio data and/or pre-processed audio data) that can then be processed by the particular secondary automated assistant.

Figure 7:
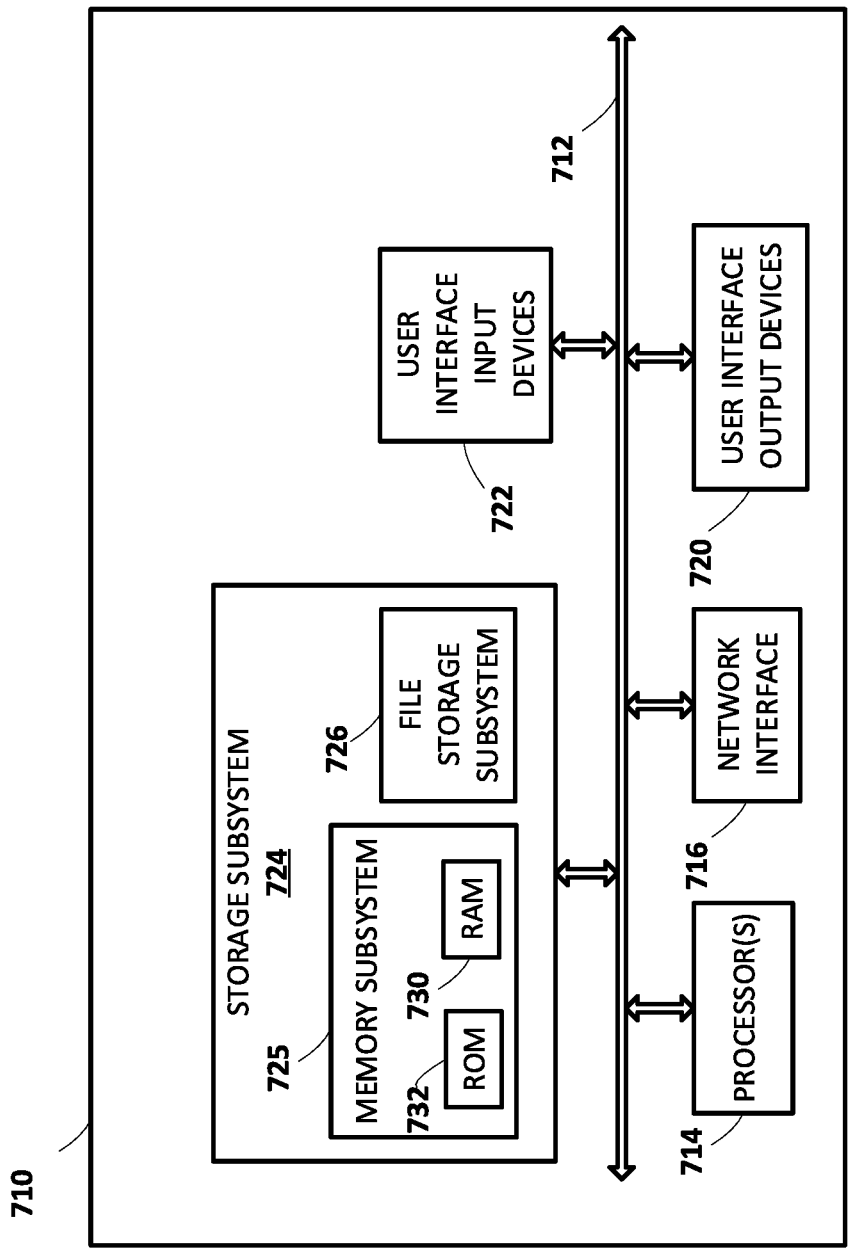
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIG. 5 and FIG. 6, and/or to implement various components depicted in FIG. 2 and FIG. 3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes: receiving, by a general automated assistant, an invocation, wherein receiving the invocation causes the general automated assistant to be invoked; receiving, via the invoked general automated assistant, a spoken query captured in audio data generated by one or more microphones of the client device; identifying historical interaction data of a user, wherein the historical interaction data is generated based on one or more past queries of the user and one or more responses generated by a plurality of secondary automated assistants in response to the one or more past queries and within a time period; and determining, based on comparing a transcription of the spoken query to the historical interaction data, that there is a relation between the spoken query and a portion of the historical interaction data that is associated with a particular automated assistant of the plurality of secondary automated assistants. In response to determining that there is the relation of the spoken query to the particular automated assistant, the method further includes: providing, to the particular automated assistant and in lieu of providing to any other of the secondary automated assistants, an indication of the audio data, wherein providing the indication of the audio data causes the particular automated assistant to generate a response to the spoken query.

These and other implementations of the technology disclosed herein can include one or more of the following features.

In some implementations, the method further includes determining, based on the historical interaction data, that there is an additional relation between the spoken query and an additional portion of the historical interaction data that is associated with a second particular automated assistant of the plurality of secondary automated assistants; determining, based on the historical interaction data, a second assistant time for a second assistant historical interaction of the user with the second particular automated assistant; determining, based on the historical interaction data, a first assistant time for a first assistant historical interaction of the user with the particular automated assistant; ranking the particular automated assistant and the second particular automated assistant based on the first assistant time and the second assistant time; and selecting the particular automated assistant based on the ranking, wherein providing, to the particular automated assistant and in lieu of providing to any other of the secondary automated assistants, the indication of the audio data, is further based on selecting the particular automated assistant based on the ranking. In some of those implementations, the method further includes: determining a first similarity score for the relation and a second similarity score for the additional relation, wherein ranking the particular automated assistant and the second particular automated assistant is further based on the first similarity score and the second similarity score.

In some implementations, the method further includes: determining a classification of the spoken query, wherein providing the transcription of the spoken query to the particular automated assistant is further based on the classification. In some of those implementations, the method further includes: identifying, based on the historical interaction data, an indicated preference of the user to utilize the particular automated assistant for one or more of the past queries that also have the classification, wherein providing the audio data to the particular automated assistant is further based on the user preference. In other of those implementations, the method further includes: generating an indication of the general automated assistant providing the audio data to the particular automated assistant; and storing the indication with an indication of the classification. In some of those instances, the method further includes: determining a current context for the audio data; and storing the current context with the indication of the general automated assistant providing the audio data to the particular automated assistant.

In some implementations, the particular automated assistant performs automatic speech recognition on the indication of the audio data to generate a textual representation of the audio data, generates natural language processing of the textual representation, and generates a response based on the natural language processing. In some of those implementations, generating a response includes: providing the natural language processing result to a third party application; receiving a response from the third party application; and generating the response based at least in part on the response from the third party.

In some implementations, the invocation indicates the particular automated assistant, and wherein the indication of the audio data is an audio representation of the audio data.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors of a client device, the method comprising:
    receiving, by a general automated assistant, an invocation, wherein receiving the invocation causes the general automated assistant to be invoked;
    receiving, via the invoked general automated assistant, a spoken query captured in audio data generated by one or more microphones of the client device;
    identifying historical interaction data of a user, wherein the historical interaction data is generated based on one or more past queries of the user and one or more responses generated by a plurality of secondary automated assistants in response to the one or more past queries and within a time period;
    determining, based on comparing a transcription of the spoken query to the historical interaction data, that there is a relation between the spoken query and a portion of the historical interaction data that is associated with a particular automated assistant of the plurality of secondary automated assistants;
    in response to determining that there is the relation of the spoken query to the particular automated assistant:
        providing, to the particular automated assistant and in lieu of providing to any other of the secondary automated assistants, an indication of the audio data, wherein providing the indication of the audio data causes the particular automated assistant to generate a response to the spoken query.

2. The method of claim 1, further comprising:
    determining, based on the historical interaction data, that there is an additional relation between the spoken query and an additional portion of the historical interaction data that is associated with a second particular automated assistant of the plurality of secondary automated assistants;
    determining, based on the historical interaction data, a second assistant time for a second assistant historical interaction of the user with the second particular automated assistant;
    determining, based on the historical interaction data, a first assistant time for a first assistant historical interaction of the user with the particular automated assistant;
    ranking the particular automated assistant and the second particular automated assistant based on the first assistant time and the second assistant time; and
    selecting the particular automated assistant based on the ranking,
    wherein providing, to the particular automated assistant and in lieu of providing to any other of the secondary automated assistants, the indication of the audio data, is further based on selecting the particular automated assistant based on the ranking.

3. The method of claim 2, further comprising:
    determining a first similarity score for the relation and a second similarity score for the additional relation, wherein ranking the particular automated assistant and the second particular automated assistant is further based on the first similarity score and the second similarity score.

4. The method of claim 1, further comprising:
    determining a classification of the spoken query, wherein providing the transcription of the spoken query to the particular automated assistant is further based on the classification.

5. The method of claim 4, further comprising:
    identifying, based on the historical interaction data, an indicated preference of the user to utilize the particular automated assistant for one or more of the past queries that also have the classification, wherein providing the audio data to the particular automated assistant is further based on the user preference.

6. The method of claim 4, further comprising:
    generating an indication of the general automated assistant providing the audio data to the particular automated assistant; and
    storing the indication with an indication of the classification.

7. The method of claim 6, further comprising:
    determining a current context for the audio data; and
    storing the current context with the indication of the general automated assistant providing the audio data to the particular automated assistant.

8. The method of claim 1, wherein the particular automated assistant performs automatic speech recognition on the indication of the audio data to generate a textual representation of the audio data, generates natural language processing of the textual representation, and generates a response based on the natural language processing.

9. The method of claim 8, wherein generating a response includes:
    providing the natural language processing result to a third party application;
    receiving a response from the third party application; and
    generating the response based at least in part on the response from the third party.

10. The method of claim 1, wherein the invocation indicates the particular automated assistant, and wherein the indication of the audio data is an audio representation of the audio data.

11. A system comprising one or more processors and memory storing instructions that, in response to execution of the instructions by the one or more processors, cause the one or more processors to perform the following operations:
    receiving, by a general automated assistant, an invocation, wherein receiving the invocation causes the general automated assistant to be invoked;
    receiving, via the invoked general automated assistant, a spoken query captured in audio data generated by one or more microphones of the client device;
    identifying historical interaction data of a user, wherein the historical interaction data is generated based on one or more past queries of the user and one or more responses generated by a plurality of secondary automated assistants in response to the one or more past queries and within a time period;
    determining, based on comparing a transcription of the spoken query to the historical interaction data, that there is a relation between the spoken query and a portion of the historical interaction data that is associated with a particular automated assistant of the plurality of secondary automated assistants;
    in response to determining that there is the relation of the spoken query to the particular automated assistant:
        providing, to the particular automated assistant and in lieu of providing to any other of the secondary automated assistants, an indication of the audio data, wherein providing the indication of the audio data causes the particular automated assistant to generate a response to the spoken query.

12. The system of claim 11, wherein the instructions further cause the one or more processors to perform the following operations:
determining, based on the historical interaction data, that there is an additional relation between the spoken query and an additional portion of the historical interaction data that is associated with a second particular automated assistant of the plurality of secondary automated assistants;
determining, based on the historical interaction data, a second assistant time for a second assistant historical interaction of the user with the second particular automated assistant;
determining, based on the historical interaction data, a first assistant time for a first assistant historical interaction of the user with the particular automated assistant;
ranking the particular automated assistant and the second particular automated assistant based on the first assistant time and the second assistant time; and
selecting the particular automated assistant based on the ranking,
wherein providing, to the particular automated assistant and in lieu of providing to any other of the secondary automated assistants, the indication of the audio data, is further based on selecting the particular automated assistant based on the ranking.

13. The system of claim 11, wherein the particular automated assistant performs automatic speech recognition on the indication of the audio data to generate a textual representation of the audio data, generates natural language processing of the textual representation, and generates a response based on the natural language processing.

14. The system of claim 13, wherein generating a response includes:
providing the natural language processing result to a third party application;
receiving a response from the third party application; and
generating the response based at least in part on the response from the third party.

15. The system of claim 11, wherein the invocation indicates the particular automated assistant, and wherein the indication of the audio data is an audio representation of the audio data.

16. At least one non-transitory computer-readable medium comprising instructions that, in response to execution of the instructions by one or more processors, cause the one or more processors to perform the following operations:
receiving, by a general automated assistant, an invocation, wherein receiving the invocation causes the general automated assistant to be invoked;
receiving, via the invoked general automated assistant, a spoken query captured in audio data generated by one or more microphones of the client device;
identifying historical interaction data of a user, wherein the historical interaction data is generated based on one or more past queries of the user and one or more responses generated by a plurality of secondary automated assistants in response to the one or more past queries and within a time period;
determining, based on comparing a transcription of the spoken query to the historical interaction data, that there is a relation between the spoken query and a portion of the historical interaction data that is associated with a particular automated assistant of the plurality of secondary automated assistants;
in response to determining that there is the relation of the spoken query to the particular automated assistant:
providing, to the particular automated assistant and in lieu of providing to any other of the secondary automated assistants, an indication of the audio data, wherein providing the indication of the audio data causes the particular automated assistant to generate a response to the spoken query.

17. The at least one non-transitory computer-readable medium of claim 16, wherein the instructions further include:
determining, based on the historical interaction data, that there is an additional relation between the spoken query and an additional portion of the historical interaction data that is associated with a second particular automated assistant of the plurality of secondary automated assistants;
determining, based on the historical interaction data, a second assistant time for a second assistant historical interaction of the user with the second particular automated assistant;
determining, based on the historical interaction data, a first assistant time for a first assistant historical interaction of the user with the particular automated assistant;
ranking the particular automated assistant and the second particular automated assistant based on the first assistant time and the second assistant time; and
selecting the particular automated assistant based on the ranking,
wherein providing, to the particular automated assistant and in lieu of providing to any other of the secondary automated assistants, the indication of the audio data, is further based on selecting the particular automated assistant based on the ranking.

18. The at least one non-transitory computer-readable medium of claim 16, wherein the particular automated assistant performs automatic speech recognition on the indication of the audio data to generate a textual representation of the audio data, generates natural language processing of the textual representation, and generates a response based on the natural language processing.

19. The at least one non-transitory computer-readable medium of claim 16, wherein generating a response includes:
providing the natural language processing result to a third party application;
receiving a response from the third party application; and
generating the response based at least in part on the response from the third party.

20. The at least one non-transitory computer-readable medium of claim 16, wherein the invocation indicates the particular automated assistant, and wherein the indication of the audio data is an audio representation of the audio data.

* * * * *